(12) United States Patent
Knierim

(10) Patent No.: US 10,360,483 B2
(45) Date of Patent: Jul. 23, 2019

(54) INK JET PRE-FIRE WAVEFORM CONTROL

(71) Applicant: XEROX CORPORATION, Norwalk, CT (US)

(72) Inventor: David L. Knierim, Wilsonville, OR (US)

(73) Assignee: XEROX CORPORATION, Norwalk, CT (US)

( * ) Notice: Subject to any disclaimer, the term of this patent is extended or adjusted under 35 U.S.C. 154(b) by 150 days.

(21) Appl. No.: 15/467,735

(22) Filed: Mar. 23, 2017

(65) Prior Publication Data

US 2018/0272704 A1    Sep. 27, 2018

(51) Int. Cl.
*B41J 2/045* (2006.01)
*G06K 15/10* (2006.01)

(52) U.S. Cl.
CPC ........ *G06K 15/102* (2013.01); *B41J 2/04581* (2013.01); *B41J 2/04596* (2013.01)

(58) Field of Classification Search
CPC ............... B41J 2/04581; B41J 2/04588; B41J 2/04541; B41J 2/04596; B41J 2/04573; B41J 2/04586; G06K 15/102

USPC .................... 347/9, 10, 11, 12, 14
See application file for complete search history.

(56) References Cited

U.S. PATENT DOCUMENTS 6,331,052 B1* 12/2001 Murai ................ B41J 2/04588
347/10

* cited by examiner

*Primary Examiner* — Jannelle M Lebron
(74) *Attorney, Agent, or Firm* — Miller Nash Graham & Dunn LLP

(57) ABSTRACT

A method, includes receiving native image data at a processor for a printing system having a jet stack including a nozzle plate with an array of jets, formatting the native image data by pixels for each jet within the array of jets to produce ordered image data, scanning the ordered image data to determine timing and frequency of any pre-fire sequences needed for each jet, replacing a portion of the ordered image data for jets that need pre-fire sequences with a predetermined trigger sequence followed by a number and pattern of pre-fire pulses to produce modified image data, and transmit the modified image data.

9 Claims, 3 Drawing Sheets

INK JET PRE-FIRE WAVEFORM CONTROL

TECHNICAL FIELD

This disclosure relates to pre-firing of ink jets, more particularly to managing data bandwidth in pre-firing waveforms.

BACKGROUND

Ink jet print heads for aqueous inks use multiple strategies for mitigating issues caused by ink drying within individual jet orifices. Ink jet print heads typically rely upon a stack of plates referred to as a jet stack, the final plate of which has an array of nozzles, also referred to as jets. When ink dries in the jet stacks or the nozzles, it causes artifacts in the resulting prints. Jets that receive a firing waveform to cause them to jet ink onto a substrate will fail to print when there is dried ink in the nozzle.

One common technique, called pre-fire or non-fire, energizes jets with a waveform of sufficiently low energy to avoid ejecting a drop of ink. These low energy waveforms serve to mix the dried high viscosity ink inside the nozzles with the bulk lower viscosity ink of the outlet chambers in the jet stack. Pre-fire waveforms typically drive a jet when the jet has not fired, or ejected ink, for some time but will fire in the near future.

Some existing systems send two bits of data to each jet for each pixel position. One bit indicates if a waveform should be driven to the jet or not. The other bit selects between a full energy, drop ejecting waveform, or a low energy pre-fire waveform. This method works well, but doubles the data bandwidth from the processor to print head, relative to a system without pre-fire capability. Techniques that do not require such high bandwidth will improve the operation of these printing systems.

SUMMARY

One embodiment consists of a method, where the method includes receiving native image data at a processor for a printing system having a jet stack including a nozzle plate with an array of jets, formatting the native image data by pixels for each jet within the array of jets to produce ordered image data, scanning the ordered image data to determine timing and frequency of any pre-fire sequences needed for each jet, replacing a portion of the ordered image data for jets that need pre-fire sequences with a predetermined trigger sequence followed by a number and pattern of pre-fire pulses to produce modified image data, and transmit the modified image data.

DETAILED DESCRIPTION OF THE EMBODIMENTS

Figure 1:
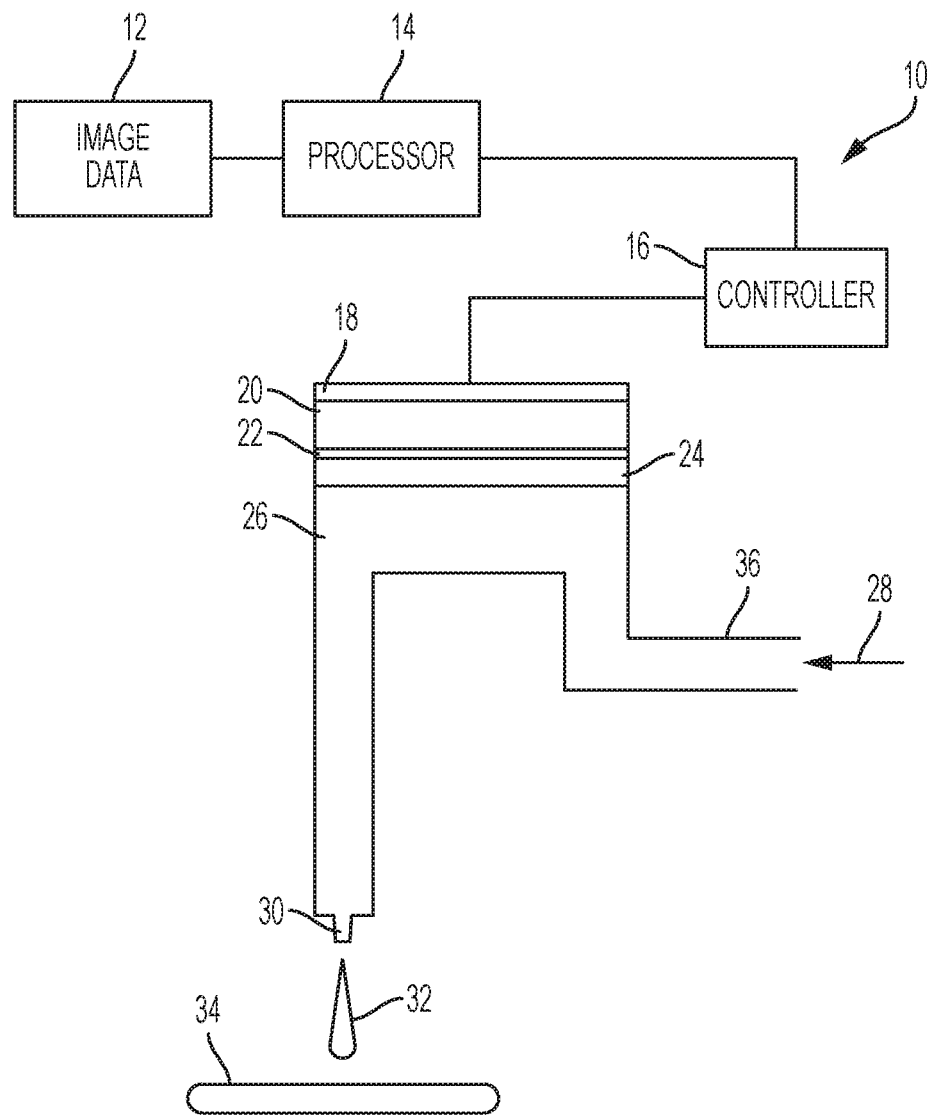
FIG. 1 show an embodiment of a single jet in an ink jet printing system.

FIG. 1 shows an example of a single jet used in a printing system 10 having an array of jets. The system includes image data 12 received at a processor 14 of the printing system. The processor has the capability of scanning the incoming image data and altering it as needed to implement embodiments shown here. The image data 12 may reside in a memory in which it is stored before and after processing, or the image data may be stored elsewhere after it is processed. This discussion will refer to the originally received image data as 'native' image data, and the data that result from the embodiments here as 'modified' image data. The processor 14 performs an initial conventional operation converting the native image data to 'ordered' image data, wherein image pixels are separated into groups, typically image columns, assigned to each jet. This ordered image data are further processed per embodiments here to form the modified image data, which is sent to the print head controller 16.

The controller applies a signal to the electrode 18 that causes the actuator 20, in this embodiment a piezoelectric element sandwiched between the electrode 18 and the electrode 22. When a signal is applied to the electrodes, the membrane 24 moves either upwards or downwards. The direction of the motion depends upon the signals applied to the electrodes. Ink 28 enters the pressure chamber 26 through the inlet 36 when the membrane moves upward, pulling the ink into the pressure chamber. When the membrane 24 deflects downwards, the ink in the pressure chamber 26 moves downward to the nozzle, or jet, 30, and exists the jet as a drop of ink 32 onto the print substrate 34.

Figure 2:
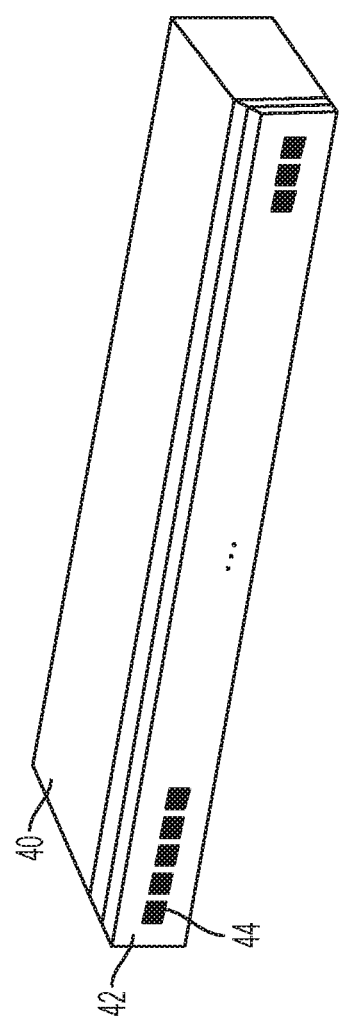
FIG. 2 shows an embodiment of a jet stack having an array of jets.

The pressure chamber 26 and other ink manifolds and routing channels, not shown, as well as the array of jets of which jet 30 is a part, are formed by a stack of plates. This stack of plates is typically referred to as the jet stack. FIG. 2 shows the set of plates making the jet stack 40, including the nozzle plate 42 that has an array of jets 44, such as that shown in FIG. 1. The array of jets 44 will normally point downwards at a print substrate such as a piece of paper, with the jet stack above the nozzle plate.

The application of signals to the electrodes of each jet determines whether the jet fires or not. The processor 14 organizes the native image data into pixels to be printed by each individual jet to produce ordered image data, modifies the image data to include pre-fire information, then sends this modified image data to the controller 16. The controller 16 derives the electrode signals from this modified image data. In a monochrome image, if the image data has a picture element (pixel) that is black, the processor codes the signal for the jet to be a 1. If the space is to remain blank (white), the processor codes the signal for the jet to be 0, in a simplest form of the discussion. One must note that the pixels of the final image may be made up of drops from several jets within the space of the final image corresponding to the pixel. Pixels may also be made of multiple drops from a single jet, or drops of varying size from a single jet.

The processor generates the image data on a page by page, or portion of a page by portion of a page, basis. If the image data has large blank spaces, the jets that provide the ink for those spaces will not fire. As discussed above, this may result in the ink in the channel between the pressure chamber and the nozzle, and/or the ink in the nozzle itself drying out. This may result in a failure of the jet to deposit ink, when the time comes for it to do so, or it may result in ejection of a drop of ink of smaller size and lower velocity than intended. In either case, an undesirable artifact will appear in the printed image.

One method of mitigating the drying of the ink generates non-firing waveforms for those jets that have remained inactive for some predetermined period. The non-firing waveforms may also be referred to as 'pre-firing' waveforms. If a jet will not receive data that will cause it to fire soon, determinable by looking at the image data, the jet does not need to receive the pre-firing waveform. Pre-firing waveforms typically perturb the membrane and move the ink in the pressure chamber and nozzle around without causing the jet to eject ink. An example of some of these types of waveforms can be found in commonly owned U.S. Pat. No. 8,403,440. The actual contents of the pre-fire waveforms and their applications lie beyond the scope of the discussion here.

One possible approach would implement the pre-fire waveforms across the entire head, all jets together. This uses little data bandwidth, but limits pre-fire to spaces between images. As discussed above, pre-fire waveforms are the most useful when implemented shortly before a jet will file real mage drops. The jets only need pre-fire when they have not been fired for some time, for example more than 1000 pixels of white, no ink drops being ejected. The data therefore has sufficient white space into which to insert pre-fire for any given jet. The white space may not align across the entire head, limiting the usefulness of pre-fire across the entire head.

In the embodiments here, a jet-by-jet method for selecting pre-fire waveforms without adding bandwidth from the processor to the print head controller is presented. As mentioned above, the processor encodes a 1 for when the jet should fire and a 0 when it should not. For pre-fire triggering, the system selects a triggering pattern that has a low likelihood of occurring in normal image data. In one embodiment, the trigger sequence is 32-bits long. In one embodiment, the trigger sequence, defined here as the sequence that precedes the pre-fire waveform bits, takes the form of 0000 0000 0000 0011 1010 1100 0111 1111. This is just one example of a sequence; users can define their sequences in any way desired. This may depend in some respects on the nature of the image data. If the sequence occurs frequently in particular types of image data, the user may desire a different sequence. In the embodiments above, the trigger sequence has 14 leading 0 bits, but only for convenience. In one embodiment, a sequence of 13 consecutive 0 data bits reverts the jet to normal firing operations. Thirteen consecutive 0 bits is an example pre-fire termination sequence. For each jet, 1 bits between the trigger sequence and the terminating sequence cause pre-fire waveforms on the jet rather than normal firing waveforms. These 1 bits control the number and timing of pre-fire waveforms. In this example, the maximum space or gap between any two pre-fire waveforms is 12 pixels, 12 0 bits, to avoid terminating pre-fire mode. In one embodiment, a sequence of 12 consecutive 0 bits exists between the end of the pre-fire trigger sequence and the start of the pre-fire data.

The print head controller 16 should have the capability of recognizing the pre-fire trigger sequence in time to blank the trigger sequence itself. Blanking the sequence means that the 1 bits within the pre-fire trigger sequence should not eject ink drops. They also do not create pre-fire waveforms. The print head controller must have enough latency for the number of pre-fire trigger sequence bits past the leading 0 bits, 18 bits in the above example. For 18 bits, for example, the data pipeline must be 18 head fire data bits deep. That way, the controller can recognize the pre-fire trigger sequence in time to avoid jetting the 1 bits of the trigger sequence.

Figure 3:
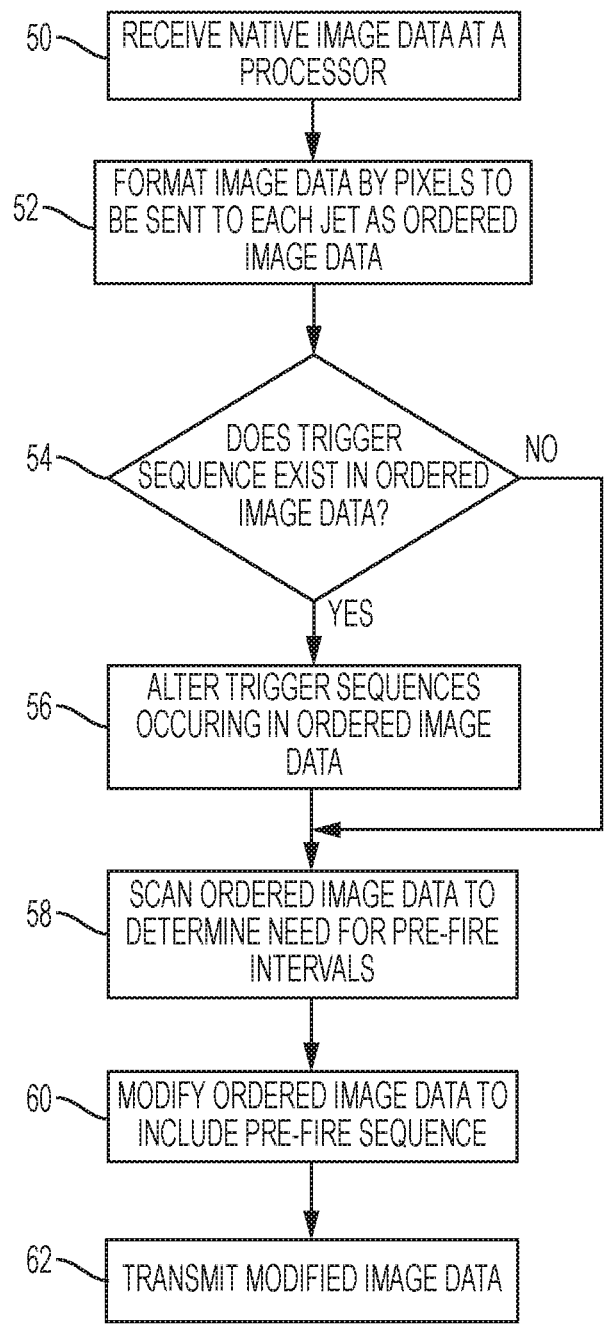
FIG. 3 shows a flowchart of a process to provide pre-fire sequences in image data.

FIG. 3 shows an embodiment of a method of including pre-fire trigger sequences in image data. At 50, the processor receives the original image data, referred to here as the native image data. At 52, the processor formats or organizes the image data into pixels assigned to each jet of the print head, generating the ordered image data. At 54, the processor scans the ordered image data for any occurrences of the pre-fire trigger sequence. If such sequences are found, the processor replaces each such sequence with a similar sequence, typically a sequence with a 1 bit moved earlier or later by 1 bit at 56. This moves a drop by one pixel. The example trigger sequence above contains both high and low-spatial frequency content, so it would typically not exist in dithered or halftoned image data. Further, moving occasional individual drops by one pixel location would not be visually detectable, so it does not impair quality.

At 58, the processor scans the image data to determine the need for pre-fire sequences. As mentioned above, this may include identifying jets that have long intervals of not firing followed by firing in the near future. Every place pre-fire is needed, the processor inserts a pre-fire sequence at 60. Each pre-fire sequence consists of the pre-fire trigger sequence, followed by the desired pre-fire waveform pattern, followed by the pre-fire termination sequence. As discussed previously, in one embodiment the termination sequence is 13 consecutive 0 bits. The controller then transmits the modified image data to the jets at 62.

For convenience in image processing, to make it easier for the processor to find any existing pre-fire trigger sequence within the ordered image data, the controller may include an option of restarting its sequence matching at the start of every 32-bit image data word. A flag bit is sent along with every $32^{nd}$ head-fire data packet from the processor to the print head controller indicating the start of new data words. The print head controller only recognizes the pre-fire trigger sequence if they start at this flagged bit position. In this manner, the processor can scan the image data with simple 32-bit word equal comparisons to recognize the pre-fire trigger sequence. This reduces computing time. The processor then transmits the modified image data to the print head at 62.

This also makes changing the pre-fire trigger sequence simpler. If the processor discovers that the image data of the application has a 32-bit word that is the pre-fire trigger sequence, it just replaces that word with an alternate similar 32-bit word. The reduced computing time of doing 32-bit word comparisons and replacements conserves processor resources. In this manner, pre-fire waveforms can be applied on a jet-by-jet basis without increasing the bandwidth from the processor to the print head.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
    receiving native image data at a processor for a printing system having a jet stack including a nozzle plate with an array of jets;
    formatting, at the processor, the native image data by pixels for each jet within the array of jets to produce ordered image data;
    scanning, with the processor, the ordered image data to determine timing and frequency of any pre-fire sequences needed for each jet, wherein the need for a pre-fire sequence is based upon a length of time after which the jet will receive a firing sequence;

replacing, using the processor, a portion of the ordered image data for jets that need pre-fire sequences with a predetermined trigger sequence followed by a number and pattern of pre-fire pulses to produce modified image data; and transmitting the modified image data to a controller on the print head.

2. The method of claim 1, further comprising scanning the native image data to determine any instances of the predetermined trigger sequence.

3. The method of claim 2, further comprising altering instances of the predetermined trigger sequence prior to the replacing.

4. The method of claim 3, wherein altering instances of the predetermined trigger sequence prior to the replacing comprises moving a 1 bit in the sequence by 1 position.

5. The method of claim 1, wherein replacing a portion of the image data comprises replacing the portion of the image data starting at a 32-bit data word boundary.

6. The method of claim 1, wherein the predetermined trigger sequence comprises 0000 0000 0000 0011 1010 1100 0111 1111.

7. The method of claim 1, wherein replacing a portion of the image data comprises blanking the predetermined trigger sequence to avoid firing the jet in response to any 1 bits in the predetermined trigger sequence.

8. The method of claim 1, further comprising including a series of 13 0 bits to return any jets receiving the predetermined trigger sequence and pre-fire pulses back to normal operation.

9. A method, comprising:
receiving native image data at a processor for a printing system having a jet stack including a nozzle plate with an array of jets;
formatting the native image data by pixels for each jet within the array of jets to produce ordered image data;
scanning the ordered image data to determine timing and frequency of any pre-fire sequences needed for each jet;
replacing a portion of the ordered image data for jets that need pre-fire sequences with a predetermined trigger sequence followed by a number and pattern of pre-fire pulses to produce modified image data;
including a pre-defined series of bits to return any jets receiving the predetermined trigger sequence and pre-fire pulses back to normal operation; and
transmit the modified image data.

* * * * *